US010949436B2

(12) United States Patent
Salunke et al.

(10) Patent No.: US 10,949,436 B2
(45) Date of Patent: Mar. 16, 2021

(54) OPTIMIZATION FOR SCALABLE ANALYTICS USING TIME SERIES MODELS

(71) Applicant: Oracle International Corporation, Redwood Shores, CA (US)

(72) Inventors: Sampanna Shahaji Salunke, Dublin, CA (US); Dustin Garvey, Oakland, CA (US); Michael Avrahamov, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 476 days.

(21) Appl. No.: 15/902,830

(22) Filed: Feb. 22, 2018

(65) Prior Publication Data

US 2018/0246941 A1   Aug. 30, 2018

Related U.S. Application Data

(60) Provisional application No. 62/463,474, filed on Feb. 24, 2017.

(51) Int. Cl.
*G06F 16/2458* (2019.01)
*G06F 12/0802* (2016.01)
(Continued)

(52) U.S. Cl.
CPC ...... *G06F 16/2477* (2019.01); *G06F 12/0802* (2013.01); *G06F 16/24552* (2019.01); *G06F 16/1824* (2019.01)

(58) Field of Classification Search
CPC .......... G06F 16/2477; G06F 16/24552; G06F 12/0802; G06F 16/1824
See application file for complete search history.

(56) References Cited

U.S. PATENT DOCUMENTS 6,298,063 B1   10/2001 Coile et al.
6,438,592 B1   8/2002 Killian
(Continued)

FOREIGN PATENT DOCUMENTS

CN   105426411 A   3/2016
CN   109359763 A   2/2019
(Continued)

OTHER PUBLICATIONS

Yokoyama, Tetsuya, "Windows Server 2008, Certification Test, Part 5: Reliability", Apr. 15, 2008, pp. 124-125 along with 4 pages of English Translation.
(Continued)

*Primary Examiner* — Cam Y T Truong
(74) *Attorney, Agent, or Firm* — Invoke

(57) ABSTRACT

Techniques are described for optimizing scalability of analytics that use time-series models. In one or more embodiments, a stored time-series model includes a plurality of data points representing seasonal behavior in a training set of time-series data for at least one season. A target time for evaluating the time-series model is then determined, and the target time or one or more times relative to the target time are mapped to a subset of the plurality of data points. Based on the mapping, a trimmed version of the time-series model is generated by loading the subset of the plurality of data points into a cache, the subset of data points representing seasonal behavior in the training set of time-series data for a portion of the at least one season. A target set of time-series data may be evaluated suing the trimmed version of the time-series in the cache.

20 Claims, 5 Drawing Sheets

(51) Int. Cl.
  *G06F 16/2455* (2019.01)
  *G06F 16/182* (2019.01)

(56) References Cited

U.S. PATENT DOCUMENTS

| | | |
|---|---|---|
| 6,597,777 B1 | 7/2003 | Ho |
| 6,643,613 B2 | 11/2003 | McGee et al. |
| 6,996,599 B1 | 2/2006 | Anders et al. |
| 7,343,375 B1 | 3/2008 | Dulac |
| 7,529,991 B2 | 5/2009 | Ide et al. |
| 7,672,814 B1 | 3/2010 | Raanan et al. |
| 7,739,143 B1 | 6/2010 | Dwarakanath et al. |
| 7,739,284 B2 | 6/2010 | Aggarwal et al. |
| 7,783,510 B1 | 8/2010 | Gilgur et al. |
| 7,987,106 B1 | 7/2011 | Aykin |
| 8,014,983 B2 | 9/2011 | Crowe et al. |
| 8,200,454 B2 | 6/2012 | Dorneich et al. |
| 8,229,876 B2 | 7/2012 | Roychowdhury |
| 8,234,236 B2 | 7/2012 | Beaty et al. |
| 8,363,961 B1 | 1/2013 | Avidan et al. |
| 8,576,964 B2 | 11/2013 | Taniguchi et al. |
| 8,650,299 B1 | 2/2014 | Huang et al. |
| 8,676,964 B2 | 3/2014 | Gopalan et al. |
| 8,694,969 B2 | 4/2014 | Bernardini et al. |
| 8,776,066 B2 | 7/2014 | Krishnamurthy et al. |
| 8,880,525 B2 | 11/2014 | Galle et al. |
| 8,930,757 B2 | 1/2015 | Nakagawa |
| 8,949,677 B1 | 2/2015 | Brundage et al. |
| 9,002,774 B2 | 4/2015 | Karlsson |
| 9,141,914 B2 | 9/2015 | Viswanathan et al. |
| 9,147,167 B2 | 9/2015 | Urmanov et al. |
| 9,195,563 B2 | 11/2015 | Scarpelli |
| 9,218,232 B2 | 12/2015 | Khalastchi et al. |
| 9,292,408 B2 | 3/2016 | Bernstein et al. |
| 9,323,599 B1 | 4/2016 | Iyer et al. |
| 9,323,837 B2 | 4/2016 | Zhao et al. |
| 9,330,119 B2 | 5/2016 | Chan et al. |
| 9,355,357 B2 | 5/2016 | Hao et al. |
| 9,367,382 B2 | 6/2016 | Yabuki |
| 9,389,946 B2 | 7/2016 | Higuchi |
| 9,471,778 B1 | 10/2016 | Seo et al. |
| 9,495,220 B2 | 11/2016 | Talyansky |
| 9,507,718 B2 | 11/2016 | Rash et al. |
| 9,514,213 B2 | 12/2016 | Wood et al. |
| 9,529,630 B1 | 12/2016 | Fakhouri et al. |
| 9,658,916 B2 | 5/2017 | Yoshinaga et al. |
| 9,692,662 B2 | 6/2017 | Chan et al. |
| 9,710,493 B2 | 7/2017 | Wang et al. |
| 9,727,533 B2 | 8/2017 | Thibaux |
| 9,740,402 B2 | 8/2017 | Manoharan et al. |
| 9,779,361 B2 | 10/2017 | Jones et al. |
| 9,811,394 B1 | 11/2017 | Kogias et al. |
| 9,961,571 B2 | 5/2018 | Yang et al. |
| 10,073,906 B2 | 9/2018 | Lu et al. |
| 10,210,036 B2 | 2/2019 | Iyer et al. |
| 2002/0019860 A1 | 2/2002 | Lee et al. |
| 2002/0092004 A1 | 7/2002 | Lee et al. |
| 2002/0183972 A1 | 12/2002 | Enck et al. |
| 2002/0188650 A1 | 12/2002 | Sun et al. |
| 2003/0149603 A1 | 8/2003 | Ferguson et al. |
| 2003/0224344 A1 | 12/2003 | Shamir et al. |
| 2004/0088406 A1 | 5/2004 | Corley et al. |
| 2005/0119982 A1 | 6/2005 | Ito et al. |
| 2005/0132030 A1 | 6/2005 | Hopen et al. |
| 2005/0159927 A1 | 7/2005 | Cruz et al. |
| 2005/0193281 A1 | 9/2005 | Ide et al. |
| 2006/0087962 A1 | 4/2006 | Golia et al. |
| 2006/0106743 A1 | 5/2006 | Horvitz |
| 2006/0212593 A1 | 9/2006 | Patrick et al. |
| 2006/0287848 A1 | 12/2006 | Li et al. |
| 2007/0011281 A1 | 1/2007 | Jhoney et al. |
| 2007/0150329 A1 | 6/2007 | Brook et al. |
| 2007/0179836 A1 | 8/2007 | Juang et al. |
| 2008/0221974 A1 | 9/2008 | Gilgur et al. |
| 2008/0288089 A1 | 11/2008 | Pettus et al. |
| 2009/0030752 A1 | 1/2009 | Senturk-Doganaksoy et al. |
| 2010/0027552 A1 | 2/2010 | Hill |
| 2010/0036857 A1 | 2/2010 | Marvasti et al. |
| 2010/0050023 A1 | 2/2010 | Scarpelli et al. |
| 2010/0082132 A1 | 4/2010 | Marruchella et al. |
| 2010/0082697 A1 | 4/2010 | Gupta et al. |
| 2010/0185499 A1 | 7/2010 | Dwarakanath et al. |
| 2010/0324869 A1 | 12/2010 | Cherkasova et al. |
| 2011/0022879 A1 | 1/2011 | Chavda et al. |
| 2011/0040575 A1 | 2/2011 | Wright et al. |
| 2011/0125894 A1 | 5/2011 | Anderson et al. |
| 2011/0126197 A1 | 5/2011 | Larsen et al. |
| 2011/0126275 A1 | 5/2011 | Anderson et al. |
| 2011/0213788 A1 | 9/2011 | Zhao et al. |
| 2011/0265164 A1 | 10/2011 | Lucovsky et al. |
| 2012/0005359 A1 | 1/2012 | Seago et al. |
| 2012/0051369 A1 | 3/2012 | Bryan et al. |
| 2012/0066389 A1 | 3/2012 | Hegde et al. |
| 2012/0110462 A1 | 5/2012 | Eswaran et al. |
| 2012/0110583 A1 | 5/2012 | Balko et al. |
| 2012/0203823 A1 | 8/2012 | Manglik et al. |
| 2012/0240072 A1 | 9/2012 | Altamura et al. |
| 2012/0254183 A1 | 10/2012 | Ailon et al. |
| 2012/0278663 A1 | 11/2012 | Hasegawa |
| 2012/0323988 A1 | 12/2012 | Barzel et al. |
| 2013/0024173 A1* | 1/2013 | Brzezicki ............... G06F 30/20 703/6 |
| 2013/0080374 A1* | 3/2013 | Karlsson ............... G06Q 10/04 706/52 |
| 2013/0151179 A1 | 6/2013 | Gray |
| 2013/0326202 A1 | 12/2013 | Rosenthal et al. |
| 2013/0329981 A1 | 12/2013 | Hiroike |
| 2014/0058572 A1 | 2/2014 | Stein et al. |
| 2014/0067757 A1 | 3/2014 | Ailon et al. |
| 2014/0095422 A1 | 4/2014 | Solomon et al. |
| 2014/0101300 A1 | 4/2014 | Rosensweig et al. |
| 2014/0215470 A1 | 7/2014 | Iniguez |
| 2014/0310235 A1 | 10/2014 | Chan et al. |
| 2014/0310714 A1 | 10/2014 | Chan et al. |
| 2014/0325649 A1 | 10/2014 | Zhang |
| 2014/0379717 A1 | 12/2014 | Urmanov et al. |
| 2015/0032775 A1 | 1/2015 | Yang et al. |
| 2015/0033084 A1 | 1/2015 | Sasturkar et al. |
| 2015/0040142 A1 | 2/2015 | Cheetancheri et al. |
| 2015/0046123 A1 | 2/2015 | Kato |
| 2015/0046920 A1 | 2/2015 | Allen |
| 2015/0065121 A1 | 3/2015 | Gupta et al. |
| 2015/0180734 A1 | 6/2015 | Maes et al. |
| 2015/0242243 A1 | 8/2015 | Balakrishnan et al. |
| 2015/0244597 A1 | 8/2015 | Maes et al. |
| 2015/0248446 A1 | 9/2015 | Nordstrom et al. |
| 2015/0251074 A1 | 9/2015 | Ahmed et al. |
| 2015/0296030 A1 | 10/2015 | Maes et al. |
| 2015/0302318 A1 | 10/2015 | Chen et al. |
| 2015/0312274 A1 | 10/2015 | Bishop et al. |
| 2015/0317589 A1 | 11/2015 | Anderson et al. |
| 2016/0034328 A1 | 2/2016 | Poola et al. |
| 2016/0042289 A1 | 2/2016 | Poola et al. |
| 2016/0092516 A1 | 3/2016 | Poola et al. |
| 2016/0105327 A9 | 4/2016 | Cremonesi et al. |
| 2016/0139964 A1 | 5/2016 | Chen et al. |
| 2016/0171037 A1 | 6/2016 | Mathur et al. |
| 2016/0253381 A1 | 9/2016 | Kim et al. |
| 2016/0283533 A1 | 9/2016 | Urmanov et al. |
| 2016/0292611 A1 | 10/2016 | Boe et al. |
| 2016/0294773 A1 | 10/2016 | Yu et al. |
| 2016/0299938 A1 | 10/2016 | Malhotra et al. |
| 2016/0299961 A1 | 10/2016 | Olsen |
| 2016/0321588 A1 | 11/2016 | Das et al. |
| 2016/0342909 A1 | 11/2016 | Chu et al. |
| 2016/0357674 A1 | 12/2016 | Waldspurger et al. |
| 2016/0378809 A1 | 12/2016 | Chen et al. |
| 2017/0061321 A1 | 3/2017 | Maiya et al. |
| 2017/0249564 A1 | 8/2017 | Garvey et al. |
| 2017/0249648 A1 | 8/2017 | Garvey et al. |
| 2017/0249649 A1 | 8/2017 | Garvey et al. |
| 2017/0249763 A1 | 8/2017 | Garvey et al. |
| 2017/0262223 A1 | 9/2017 | Dalmatov et al. |
| 2017/0329660 A1 | 11/2017 | Salunke et al. |

(56) References Cited

U.S. PATENT DOCUMENTS

| | | | |
|---|---|---|---|
| 2017/0351563 | A1 | 12/2017 | Miki et al. |
| 2017/0364851 | A1 | 12/2017 | Maheshwari et al. |
| 2018/0026907 | A1 | 1/2018 | Miller et al. |
| 2018/0039555 | A1 | 2/2018 | Salunke et al. |
| 2018/0052804 | A1 | 2/2018 | Mikami et al. |
| 2018/0053207 | A1 | 2/2018 | Modani et al. |
| 2018/0059628 | A1 | 3/2018 | Yoshida |
| 2018/0081629 | A1 | 3/2018 | Kuhhirte et al. |
| 2018/0219889 | A1* | 8/2018 | Oliner .............. G06N 3/08 |
| 2018/0321989 | A1 | 11/2018 | Shetty et al. |
| 2018/0324199 | A1 | 11/2018 | Crotinger et al. |
| 2018/0330433 | A1 | 11/2018 | Frenzel et al. |
| 2019/0042982 | A1 | 2/2019 | Qu et al. |
| 2019/0065275 | A1 | 2/2019 | Wong et al. |
| 2020/0034745 | A1* | 1/2020 | Nagpal .............. G06N 5/022 |

FOREIGN PATENT DOCUMENTS

| | | |
|---|---|---|
| JP | 2006-129446 A | 5/2006 |
| WO | 2011/071624 A2 | 6/2011 |
| WO | 2013/016584 A1 | 1/2013 |

OTHER PUBLICATIONS

Willy Tarreau: "HAProxy Architecture Guide", May 25, 2008 (May 25, 2008), XP055207566, Retrieved from the Internet: URL:http://www.haproxy.org/download/1.2/doc/architecture.txt [retrieved on Aug. 13, 2015].

Voras I et al: "Evaluating open-source cloud computing solutions", MIPRO, 2011 Proceedings of the 34th International Convention, IEEE, May 23, 2011 (May 23, 2011), pp. 209-214.

Voras et al., "Criteria for Evaluation of Open Source Cloud Computing Solutions", Proceedings of the ITI 2011 33rd international Conference on Information Technology Interfaces (ITI), US, IEEE, Jun. 27-30, 2011, 6 pages.

Taylor J W et al: "Forecasting intraday time series with multiple seasonal cycles using parsimonious seasonal exponential smoothing", OMEGA, vol. 40, No. 6, Dec. 2012 (Dec. 2012), pp. 748-757.

Szmit et al., "Usage of Modified Holt-Winters Method in the Anomaly Detection of Network Traffic: Case Studies", Journal of Computer Networks and Communications, vol. 2012, Article ID 192913, Mar. 29, 2012, pp. 1-5.

Somlo, Gabriel, et al., "Incremental Clustering for Profile Maintenance in Information Gathering Web Agents", Agents '01, Montreal, Quebec, Canada, May 28-Jun. 1, 2001, pp. 262-269.

Slipetskyy, Rostyslav, "Security Issues in OpenStack", Master's Thesis, Technical University of Denmark, Jun. 2011, 90 pages.

Nurmi D et al: "The Eucalyptus Open-Source Cloud-Computing System", Cluster Computing and the Grid, 2009. CCGRID '09. 9th IEEE/ACM International Symposium on, IEEE, Piscataway, NJ, USA, May 18, 2009 (May 18, 2009), pp. 124-131.

NPL: Web document dated Feb. 3, 2011, Title: OpenStack Compute, Admin Manual.

Niino,Junichi, "Open Source Cloud infrastructure 'OpenStack', its History and Scheme", available online at <http://www.publickey1.jp/blog/11/openstack_1.html>, Jun. 13, 2011, 8 pages.

Jarvis, R. A., et al., "Clustering Using a Similarity Measure Based on Shared Neighbors", IEEE Transactions on Computers, vol. C-22, No. 11, Nov. 1973, pp. 1025-1034.

Haugen et al., "Extracting Common Time Trends from Concurrent Time Series: Maximum Autocorrelation Factors with Applications", Stanford University, Oct. 20, 2015, pp. 1-38.

Gueyoung Jung et al: "Performance and availability aware regeneration for cloud based multitier applications", Dependable Systems and Networks (DSN), 2010 IEEE/IFIP International Conference on, IEEE, Piscataway, NJ, USA, Jun. 28, 2010 (Jun. 28, 2010), pp. 497-506.

Davies, David L., et al., "A Cluster Separation measure", IEEE Transactions on Pattern Analysis and Machine Intelligence, vol. PAMI-1, No. 2, Apr. 1979, pp. 224-227.

Chris Bunch et al: "AppScale: Open-Source Platform-as-a-Service", Jan. 1, 2011 (Jan. 1, 2011), XP055207440, Retrieved from the Internet: URL:http://128.111.41.26/research/tech reports/reports/2011-01 .pdf [retrieved on Aug. 12, 2015] pp. 2-6.

Anonymous: "High Availability for the Ubuntu Enterprise Cloud (UEC)—Cloud Controller (CLC)", Feb. 19, 2011 (Feb. 19, 2011), XP055207708, Retrieved from the Internet: URL:http://blog.csdn.net/superxgl/article/details/6194473 [retrieved on Aug. 13, 2015] p. 1.

Andrew Beekhof: "Clusters from Scratch—Apache, DRBD and GFS2 Creating Active/Passive and Active/Active Clusters on Fedora 12", Mar. 11, 2010 (Mar. 11, 2010), XP055207651, Retrieved from the Internet: URL:http://clusterlabs.org/doc/en-US/Pacemaker/1.0/pdf/Clusters from Scratch/Pacemaker-1.0-Clusters from Scratch-en-US.pdi [retrieved on Aug. 13, 2015].

Alberto Zuin: "OpenNebula Setting up High Availability in OpenNebula with LVM", May 2, 2011 (May 2, 2011), XP055207701, Retrieved from the Internet: URL:http://opennebula.org/setting-up-highavailability-in-opennebula-with-lvm/ [retrieved on Aug. 13, 2015] p. 1.

"OpenStack Object Storage Administrator Manual", Jun. 2, 2011 (Jun. 2, 2011), XP055207490, Retrieved from the Internet: URL:http://web.archive.org/web/20110727190919/http://docs.openstack.org/cactus/openstack-object-storage/admin/os-objectstorage-adminguide-cactus.pdf [retrieved on Aug. 12, 2015].

"OpenStack Compute Administration Manual", Mar. 1, 2011 (Mar. 1, 2011), XP055207492, Retrieved from the Internet: URL:http://web.archive.org/web/20110708071910/http://docs.openstack.org/bexar/openstack-compute/admin/os-aompute-admin-book-bexar.pdf [retrieved on Aug. 12, 2015].

Charapko, Gorilla—Facebook's Cache for Time Series Data, http://charap.co/gorilla-facebooks-cache-for-monitoring-data/, Jan. 11, 2017.

Suntinger, "Trend-based similarity search in time-series data," 2010, Second International Conference on Advances in Databases, Knowledge, and Data Applications, IEEE, pp. 97-106 (Year: 2010).

Hao et al., Visual Analytics of Anomaly Detection in Large Data Streams, Proc. SPIE 7243, Visualization and Data Analysis 2009, 10 pages.

Gunter et al., Log Summarization and Anomaly Detection for Troubleshooting Distributed Systems, Conference: 8th IEEE/ACM International Conference on Grid Computing (GRID 2007), Sep. 19-21, 2007, Austin, Texas, USA, Proceedings.

Ahmed, Reservoir-based network traffic stream summarization for anomaly detection, Article in Pattern Analysis and Applications, Oct. 2017.

Greunen, "Forecasting Methods for Cloud Hosted Resources, a comparison," 2015, 11th International Conference on Network and Service Management (CNSM), pp. 29-35 (Year: 2015).

Faraz Rasheed, "A Framework for Periodic Outlier Pattern Detection in Time-Series Sequences," May 2014, IEEE.

Herbst, "Self-adaptive workload classification and forecasting for proactive resource provisioning", 2014, ICPE'13, pp. 187-198 (Year: 2014).

Wilks, Samuel S. "Determination of sample sizes for setting tolerance limits," The Annals of Mathematical Statistics 12.1 (1941): 91-96.

Qiu, Hai, et al. "Anomaly detection using data clustering and neural networks." Neural Networks, 2008. IJCNN 2008.(IEEE World Congress on Computational Intelligence). IEEE International Joint Conference on. IEEE, 2008.

Lin, Xuemin, et al. "Continuously maintaining quantile summaries of the most recent n elements over a data stream," IEEE, 2004.

Greenwald et al. "Space-efficient online computation of quantile summaries." ACM Proceedings of the 2001 SIGMOD international conference on Management of data pp. 58-66.

Dunning et al., Computing Extremely Accurate Quantiles Using t-Digests.

Time Series Pattern Search: A tool to extract events from time series data, available online at <https://www.ceadar.ie/pages/time-series-pattern-search/>, retrieved on Apr. 24, 2020, 4 pages.

Yin, "System resource utilization analysis and prediction for cloud based applications under bursty workloads," 2014, Information Sciences, vol. 279, pp. 338-357 (Year: 2014).

(56) References Cited

OTHER PUBLICATIONS

Jain and Chlamtac, P-Square Algorithm for Dynamic Calculation of Quantiles and Histograms Without Storing Observations, ACM, Oct. 1985 (10 pages).
Li et al., "Forecasting Web Page Views: Methods and Observations," in 9 J. Machine Learning Res. 2217-50 (2008). (Year 2008).

* cited by examiner

OPTIMIZATION FOR SCALABLE ANALYTICS USING TIME SERIES MODELS

BENEFIT CLAIM; RELATED APPLICATIONS

This application claims the benefit of U.S. Provisional Patent Application 62/463,474, filed Feb. 24, 2017, which is hereby incorporated by reference.

This application is related to U.S. application Ser. No. 15/266,971, entitled "SEASONAL AWARE METHOD FOR FORECASTING AND CAPACITY PLANNING"; U.S. application Ser. No. 15/445,763, entitled "METHOD FOR CREATING PERIOD PROFILE FOR TIME-SERIES DATA WITH RECURRENT PATTERNS"; U.S. application Ser. No. 15/140,358, entitled "SCALABLE TRI-POINT ARBITRATION AND CLUSTERING"; U.S. application Ser. No. 15/057,065, entitled "SYSTEM FOR DETECTING AND CHARACTERIZING SEASONS"; U.S. application Ser. No. 15/057,060, entitled "SUPERVISED METHOD FOR CLASSIFYING SEASONAL PATTERNS"; U.S. application Ser. No. 15/057,062, entitled "UNSUPERVISED METHOD FOR CLASSIFYING SEASONAL PATTERNS"; and U.S. application Ser. No. 15/609,938, entitled "UNSUPERVISED METHOD FOR BASELINING AND ANOMALY DETECTION IN TIME-SERIES DATA FOR ENTERPRISE SYSTEMS", the entire contents for each of which are incorporated by reference herein as if set forth in their entirety.

TECHNICAL FIELD

The present disclosure relates to generating time-series models within computing systems. In particular, the present disclosure relates to optimizing scalability of time-series modelling based on caching techniques.

BACKGROUND

Time-series data may be used to generate models relevant to machine learning and other computing applications. Example time-series models include, but are not limited to, Additive and Multiplicative Holt Winters models, which learn and represent seasonal patterns from time-series data. Applications may perform various tasks based on the learned seasonal patterns, such as forecast generation, capacity planning operations, and predictive alerting.

Time-series models may vary greatly in the number of data points used to represent learned behavior. In the case of an Additive or Multiplicative Holt-Winters, for instance, the model's size depends on the sampling frequency of the data and the type of seasonal patterns detected. A weekly time-series model is typically larger than a daily time-series model, which is typically larger than an hourly time-series model. Even within models tracking the same types of seasonal patterns (e.g., daily or weekly), a model that tracks seasonality for data sampled every minute is five times larger than a model that tracks seasonality for data sampled every five minutes. Thus, the size of a time-series model may vary significantly based on multiple factors. As a result, systems may have difficulty anticipating the amount of storage and processing overhead involved in evaluating time-series data using different time-series models.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
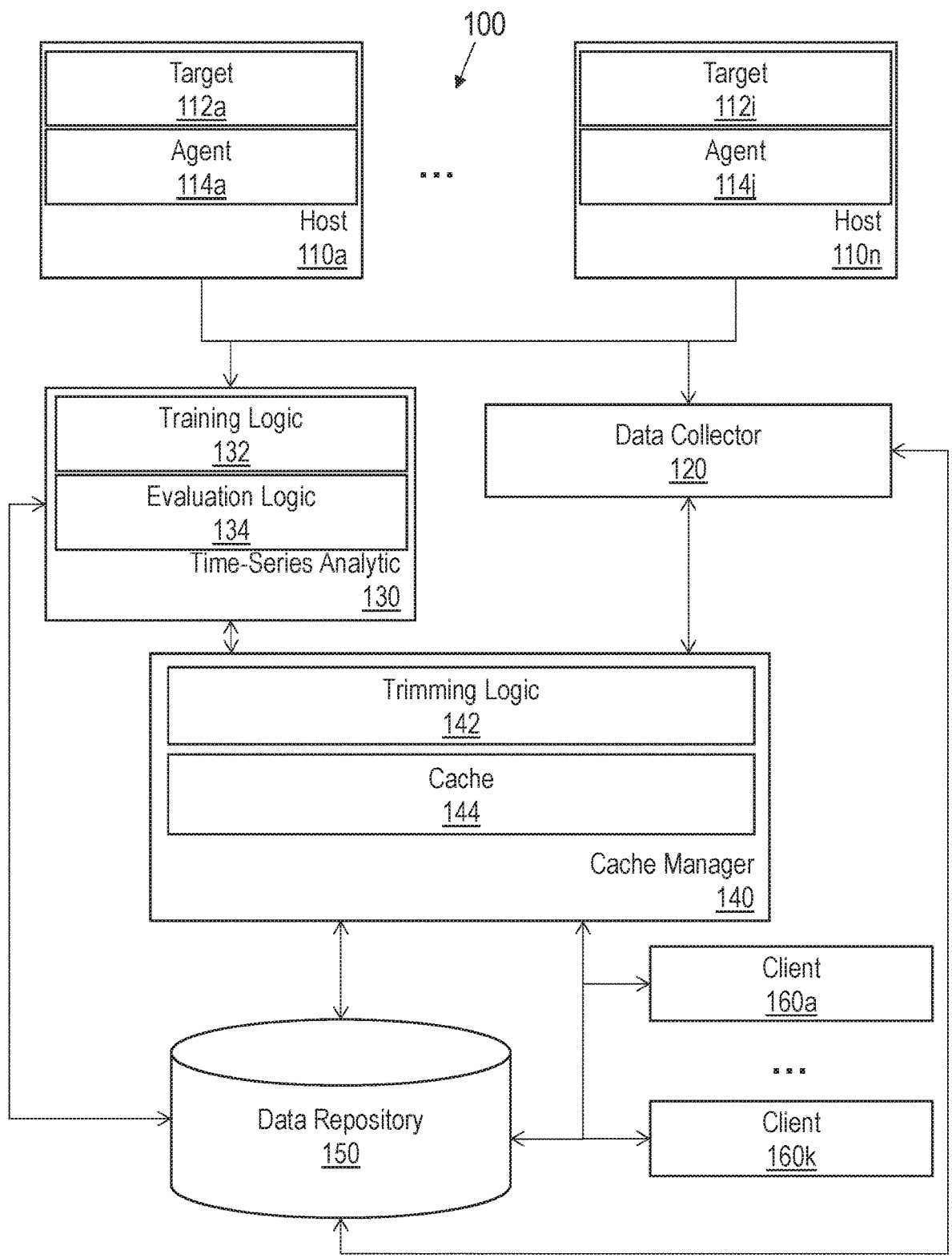
FIG. 1 illustrates a system for caching time-series models in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 GENERAL OVERVIEW
2.0 ARCHITECTURAL OVERVIEW
3.0 TRIMMED MODELS
   3.1 TRIMMING AS A FUNCTION OF TARGET TIME
   3.2 TRIM PARAMETER SELECTION AND TUNING
   3.3 CACHING PROCESS
4.0 MODEL TRAINING AND EVALUATION
   4.1 TRAINING PHASE
   4.2 EVALUATION PHASE
5.0 MICROSERVICE-BASED CACHING
6.0 CLOUD SERVICE OVERVIEW
7.0 HARDWARE OVERVIEW
8.0 MISCELLANEOUS; EXTENSIONS 1.0 General Overview Time-series models may comprise a relatively large number (e.g., hundreds, thousands, or more) of data points. As a result, evaluating incoming time-series data may involve significant storage and processing costs.

One approach for improving performance is to cache time-series models as new time-series data is received. Caching may reduce the number of database fetches and disk accesses when evaluating the incoming time-series data. However, caching the entire time-series model may require a prohibitive amount of memory. Also, due to the variable size of time-series models, it may be difficult to determine how much memory to allocate for a cache to store the time-series model.

Techniques described herein provide for caching of parts of a time-series model that are relevant to a target time. By caching a portion of the model instead of the entire model, the amount of memory allocated for a cache may be significantly reduced. In addition, the cache size may be more easily determined and, in some cases, fixed for different types of time-series models, even when the size of the time-series models is not known beforehand.

In one or more embodiments, the parts of a time-series model to cache are determined as a function of time. As part of a caching process, a target time may be determined where the target time may correspond to a current time, a time identifying how long parts of the time-series model have been cached, a time associated with newly received time-series data, a time associated with received queries, and/or any other time of interest. The caching process may analyze the target time to select one or more parts of a time-series model to cache. For example, the caching process may select parts of the time-series model as a function of how long the model is cached and/or how much data older than the target time should be processed. In addition or alternatively, the time-series model may select parts of the time-series model to cache based on a current time during which the caching process is executed and/or timestamp information identifying a time associated with time-series data being evaluated using the time-series model.

In one or more embodiments, a target time and/or one or more other times relative to a target time are mapped to a subset of data points in a time-series model. The mapping may be performed even though the data points in the time-series model may not be associated with explicit timestamps. For example, a daily seasonal model may include a plurality of data points representing different daily patterns that were generated based on analyzing a set of training time-series data spanning multiple days or weeks. In other words, the daily patterns are not associated with a specific date and time (e.g., Feb. 24, 2017 at 2:00 p.m.). Rather, the daily patterns are learned from data points associated with different timestamps.

In one or more embodiments, a trimmed version of the time-series model is generated based on the mapping of the target time (or one or more times relative to the target time) to the subset of data points. The trimmed version of the time-series model may be generated by loading the subset of data points into the cache. In the context of a seasonal time-series model, such as a Holt-Winters model, the subset of data points loaded into the cache represent seasonal behavior for a portion of the at least one season. For example, the subset of data points may represent hourly seasonal behavior within a daily season, daily seasonal behavior within a weekly season, daily seasonal behavior within a monthly season, weekly seasonal behavior within a monthly season, etc.

Once loaded into the cache, the trimmed version of the time-series model may be used to generate and output a set of one or more evaluation results. Example evaluation results may include, but are not limited to, forecasts, predictive alerts, anomaly detection warnings, and capacity planning operations. Additionally or alternatively, other evaluation results may be generated, depending on the particular implementation. By trimming the time-series models, the memory footprint and number of input/output (I/O) operations may be significantly reduced during the evaluation phase. Further, trimming allows the number of time-series models that are cached to increase substantially, improving scalability and optimizing processing of large streams of data. As a result, applications relying on time-series models to evaluate streams of data may have faster response times and a reduction in the mean time to recover (MTTR).

2.0 Architectural Overview

A time series signal comprises a sequence of values that are captured over time. The source of the time series data and the type of information that is captured may vary from implementation to implementation. For example, a time series may be collected from one or more software and/or hardware resources and capture various performance attributes of the resources from which the data was collected. As another example, a time series may be collected using one or more sensors that measure physical properties, such as temperature, pressure, motion, traffic flow, or other attributes of an object or environment.

FIG. 1 illustrates an example system for automatic baselining and anomaly detection based on time-series data captured by one or more host devices. System 100 generally comprises hosts 110a to 110n, data collector 120, time-series analytic 130, cache manager 140, data repository 140, and clients 150a to 150k. Components of system 100 may be implemented in one or more host machines operating within one or more clouds or other networked environments, depending on the particular implementation.

Hosts 110a to 110n represent a set of one or more network hosts and generally comprise targets 112a to 112i and agents 114a to 114j. A "target" in this context refers to a resource that serves as a source of time series data. For example, a target may be a software deployment such as a database server instance, middleware instance, or some other software resource executing on a network host. Additionally or alternatively, a target may be a hardware resource, an environmental characteristic, or some other physical resource for which metrics may be measured and tracked.

Agents 114a to 114j comprise hardware and/or software logic for capturing time-series measurements from a corresponding target (or set of targets) and sending these metrics to data collector 120. In one or more embodiments, an agent includes a process, such as a service or daemon, that executes on a corresponding host machine and monitors one or more software and/or hardware resources that have been deployed. Additionally or alternatively, an agent may include one or more hardware sensors, such as microelectromechanical (MEMs) accelerometers, thermometers, pressure sensors, etc., that capture time-series measurements of a physical environment and/or resource. Although only one agent and target is illustrated per host in FIG. 1, the number of agents and/or targets per host may vary from implementation to implementation. Multiple agents may be installed on a given host to monitor different target sources of time series data. In other embodiments, an agent that resides remotely on a different host than a target may be responsible for collecting sample time-series data from the target.

Data collector 120 includes logic for aggregating data captured by agents 114a to 114j into a set of one or more time-series. Data collector 120 may store the time series data in data repository 140. Additionally or alternatively, data collector 120 may provide the time-series data to time-series analytic 130 and/or cache manager 140. In one or more embodiments, data collector 120 receives data from agents 114a to 114j over one or more data communication networks, such as the Internet. Example communication protocols that may be used to transport data between the components illustrated within system 100 may include, without limitation, the hypertext transfer protocol (HTTP), simple network management protocol (SNMP), and other communication protocols of the internet protocol (IP) suite.

Time-series analytic 130 includes training logic 132 and evaluation logic 134. Training logic 132 builds a set of one or more time-series models using a training set of time-series data. Example time-series models may include, but are not limited to the Additive and Multiplicative Holt-Winters Models. Evaluation logic 134 generates an evaluation result, such as a forecast, system configuration, or alert, based on the trained time-series models. Example implementations for training and evaluating time-series models are described in U.S. application Ser. No. 15/266,971, entitled "SEASONAL AWARE METHOD FOR FORECASTING AND CAPACITY PLANNING"; U.S. application Ser. No. 15/445,763, entitled "METHOD FOR CREATING PERIOD PROFILE FOR TIME-SERIES DATA WITH RECURRENT PATTERNS"; U.S. application Ser. No. 15/140,358, entitled "SCALABLE TRI-POINT ARBITRATION AND CLUSTERING"; U.S. application Ser. No. 15/057,065, entitled "SYSTEM FOR DETECTING AND CHARACTERIZING SEASONS"; U.S. application Ser. No. 15/057,060, entitled "SUPERVISED METHOD FOR CLASSIFYING SEASONAL PATTERNS"; U.S. application Ser. No. 15/057,062, entitled "UNSUPERVISED METHOD FOR CLASSIFYING SEASONAL PATTERNS"; and U.S. application Ser. No. 15/609,938, entitled "UNSUPERVISED METHOD FOR BASELINING AND ANOMALY DETECTION IN TIME-SERIES DATA FOR ENTERPRISE SYSTEMS", previously incorporated by reference.

Cache manager 140 generally comprises trimming logic 142 and cache 144. Trimming logic 142 is configured to generate trimmed time-series models as a function of a target time. Trimming logic 142 loads the trimmed time-series models into cache 144, which may comprise random-access memory (RAM), flash, and/or any other form of volatile and/or nonvolatile storage. In one or more embodiments, evaluation logic 144 evaluates streams of time-series data using trimmed time-series models loaded into cache 144. Cache 144 may be allocated from storage that is faster than data repository 150 to optimize response times during the evaluation phase.

Data repository 150 includes volatile and/or non-volatile storage for storing time-series models generated by time-series analytic 130. Data repository 150 may be implemented by any type of storage unit and/or device (e.g., a file system, database, collection of tables, disk, tape cartridge, random access memory, disk, or any other storage mechanism) for storing data. Further, data repository 150 may include multiple different storage units and/or devices. The multiple different storage units and/or devices may or may not be of the same type or located at the same physical site. Further, data repository 150 may be implemented or may execute on the same computing system as one or more other components of FIG. 1 and/or may reside remotely from one or more other components.

Clients 160*a* to 160*k* represent one or more clients that may access time-series analytic 130 to evaluate streams of time-series data. A "client" in this context may be a human user, such as an administrator, a client program, or some other application instance. A client may execute locally on the same host as time-series analytic or may execute on a different machine. If executing on a different machine, the client may communicate with time-series analytic 130 via one or more data communication protocols according to a client-server model, such as by submitting HTTP requests invoking one or more of the services and receiving HTTP responses comprising results generated by one or more of the services. Time-series analytic 130 may provide clients 160*a* to 160*k* with an interface through which one or more of the provided services may be invoked. Example interfaces may comprise, without limitation, a graphical user interface (GUI), an application programming interface (API), a command-line interface (CLI) or some other interface that allows a user to interact with and invoke one or more of the provided services.

3.0 Trimmed Models

Time-series models may include a significant number of data points that represent learned behavior. For example, a model representing daily resource usage patterns in a datacenter may categorize samples taken at one-minute intervals. Each model data point represents behavior, such as seasonal patterns, exhibited at the corresponding interval. For example, each model data point may indicate whether a corresponding minute of a prototypical day experiences sparse high resource usage, dense high resource usage, low resource usage, and/or exhibits other seasonal behavior. Additionally or alternatively, each model data point may include a seasonal factor that quantifies seasonal behavior at the corresponding interval, where the seasonal factor may be multiplied or added to a trend line to account for seasonal patterns. In the present example, the complete time-series model may comprise 1440 data points: one for each one-minute interval in the day.

During application runtime, data points that are not relevant may be trimmed from the model, and the remaining data points stored in cache 144. The data points that are deemed relevant may vary from application to application. For example, one application may frequently query data points within a one-hour time window of a target time. In this scenario, data points outside the one-hour time window may be trimmed. In other applications, data points within a larger time window, a smaller time window, or separate time windows may be frequently queried. The data points that are retained from the model may be different for these cases based on which portions of the model are most likely to be evaluated.

Trimming time-series models may yield significant memory savings. For example, trimming a daily model with a one-minute sampling rate to a two-hour window reduces the number of data points from 1440 to 120. Trimming the daily time-series model further to a one-hour window reduce the number of data points further to 60. The memory savings for various time-series models are illustrated in TABLE 1 below.

TABLE 1

COMPARISON OF MODEL SIZES

| | Approximate model size in data points, ignoring constant fields | | |
|---|---|---|---|
| | Complete model | Trimmed to 2 hours | Trimmed to 1 hour |
| Daily model (01 minute) | 1440 | 120 | 60 |
| Daily model (05 minute) | 288 | 24 | 12 |
| Daily model (15 minute) | 96 | 8 | 4 |
| Weekly model (01 minute) | 10080 | 120 | 60 |
| Weekly model (05 minute) | 2016 | 24 | 12 |
| Weekly model (15 minute) | 672 | 8 | 4 |

TABLE 1 compares six different time-series models: three daily seasonality models and three weekly seasonality models. Each seasonality model has a sample rate of 1 minute, 5 minutes, or 15 minutes. The chart shows the number of data points for the complete model, a model trimmed to a two-hour window, and a model trimmed to a one-hour window. For example, a daily model with a sample rate of 5 minutes has 288 data points in the complete model representing 288 five minute intervals in a day. A weekly model with a sample rate of 5 minutes has 2016 data points representing 2016 five-minute intervals in a week. When trimmed to a two-hour window, the number of data points are reduced to 24 for both the daily and seasonal models that have a 5 minute sampling rate. When trimmed to one hour, the number of data points are reduced to 12 for both models. For the one-minute daily and weekly models, trimming the model to a two-hour window.

In the tables above, the approximate model sizes ignored constant fields. In some cases, there may be no seasonal patterns detected for a corresponding seasonal factor. This scenario may occur if the data points in the training set of data have a high level of variance between different instances of a season. For example, resource usage observed for Monday at 9:00-10:00 a.m. in a weekly model may not follow any discernable pattern. In this case, the seasonal factor may be represented by a constant indicating that no seasonal behavior was detected. In one or more embodiments, data points indicating no seasonal behavior may be dropped from the trimmed version of the model. Thus, the size of the trimmed models may be further reduced beyond what is illustrated in TABLE 1.

Trimming time-series models also provides for predictable model sizes, allowing for more efficient memory allocation. For example, the complete weekly models have significantly more data points than the daily models illustrated in TABLE 1. However, when trimmed to a fixed-size window, different models having the same sample rate share the same number of data points. Thus, a model may transition to a different wavelength, such as from a daily model to a weekly model, without requiring more memory.

3.1 Trimming as a Function of Target Time

In one or more embodiments, cache manager 140 is configured to cache parts of time-series models as a function of a target time. The target time may vary from application to application. For example, a baselining and anomaly detection model may monitor time-series behavior in real-time. In this scenario, the current time may be selected as the target time. In other applications, the target time may be the current time plus or minus an offset or any other time for which the time-series model is likely to be next evaluated.

In one or more embodiments, the target time is determined based on newly received time-series data. As previously mentioned, data collector 120 may continuously or periodically collect performance metrics for targets 112*a-i*. The performance metrics may be associated with time-stamps identifying when the measurements were taken. For instance, a CPU utilization metric from a target processor may have a timestamp indicating the date and time of the measurement. Other performance metrics may also be measured at or around the same time as the CPU utilization metric. The target time may be selected as the most recent time identified in the timestamps associated with the collected metrics.

Once identified, the target time is mapped to one or more parts of a model to cache. In one or more embodiments, the target time is mapped to a window. For example, a two hour window may be represented as (target time−60 minutes) to (target time+60 minutes). A one hour window may be represented as (target time−30 minutes) to (target time+30 minutes). The window may be centered around the target time or may be skewed forward or backward, depending on the particular implementation. For example, a two-hour window may instead be represented as (target time−30 minutes) to (target time+90 minutes). The data points corresponding to these windows may then be loaded into cache 144. The cached parts of the model may allow for time-series data older than the target time and/or data more recent than the target time to be evaluated. The remaining data points of the model that fall outside the window are trimmed and not loaded into cache 144.

The parts of the model that are mapped to the target time may not be explicitly associated with a timestamp pinpointing an exact date. For example, a model may include a data point representing a seasonal factor for Thursday at 12:01 p.m. The seasonal factor for this day and time may be generated as a function of multiple weeks/samples of data points collected from different Thursdays, where each sample data point has a unique timestamp identifying a different date. If a newly collected performance metric is received for Thursday at 12:01 p.m., the associated timestamp may include a unique date. However, the target time may still be mapped to the seasonal factor for Thursday at 12:01 p.m. based on the day and time.

In one or more embodiments, the target time may be adjusted for alignment with the time-series model. The adjustment may be performed in cases where the target time does not match an exact time corresponding to a data point in the model. For example, the most recent timestamp for a performance metric may be Monday at 10:02 a.m. A time-series model that has a sample rate of five minutes may have one data point representing Monday at 10:00 a.m. and another representing Monday at 10:05 a.m. The target time may be aligned with the nearest neighbor, which in the present example is Monday at 10:00 a.m., to account for slight differences in the sampling times. The mapping may then be performed based on the adjusted target time.

3.2 Trim Parameter Selection and Tuning

Various parameters, referred to herein as trim parameters, affect the characteristics of the parts of the time-series model that are cached. Example trim parameters include, but are not limited to, the window size, the target time, and the sample rate. Many of the trim parameters affect the amount of data that is cached. Referring to TABLE 1, for instance, the model size decreases as the sampling interval is increased. Additionally, the model size decreases as the trim window is reduced.

The trim parameters may be exposed to an end user and/or automatically selected. For example, a user may select and adjust the preferred window size and sample rate through a GUI. Thus, a user may inject domain knowledge to tune the memory footprint of the models based on how the models are most likely to be used.

Additionally or alternatively, the trim parameters may be selected and adjusted based on one or more factors such as available memory, cache hits, and query characteristics. For example, the window size for caching parts of a model may be decreased as available memory decreases to reduce the memory footprint of the trimmed model. As another example, the window size may be increased if the number of cache misses exceeds a threshold to reduce the number of database fetches and disk accesses that are performed. In yet another example, the window may be increased as the query frequency increases.

In one or more embodiments, trim parameters are adjusted to balance the memory footprints of multiple models loaded in cache 144. For example, a time-series model representing seasonal behavior of a hardware or software resource may be frequently queried and evaluated while the time-series model representing seasonal behavior of a separate resource is rarely evaluated. In this scenario, more cache space may be allocated to the frequently evaluated time-series model to minimize the likelihood of cache misses.

This may be done by increasing the trim window size for the frequently evaluated model and reducing the trim window size for the infrequently evaluated model. The net effect may be to maintain the same cache footprint for both models while reducing database fetches and disk accesses.

3.3 Caching Process

In one or more embodiments, cache manager 140 is configured to execute a caching process whereby parts of time-series models are cached as a function of a target time. Cache manager 140 comprises trimming logic 142 that maps the target time and/or one or more times relative to the target time to parts of one or more time-series models. Based on the mapping, cache manager 140 generates one or more trimmed time-series models by loading the corresponding parts into cache 144. Evaluation logic 134 and clients 160*a-k* may read the trimmed time-series model from cache 144 rather than loading the entire time-series model to evaluate incoming time-series data.

Figure 2:
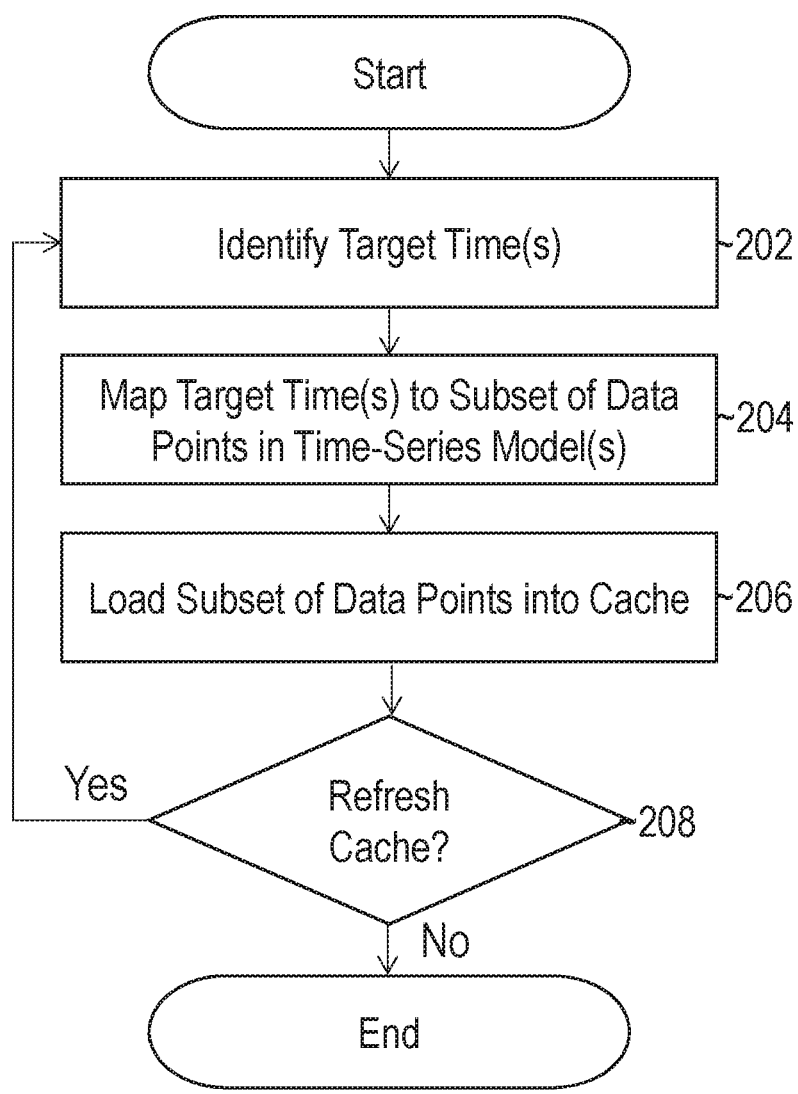
FIG. 2 illustrates an example set of operations for trimming time-series models in accordance with one or more embodiments.

FIG. 2 illustrates an example set of operations for trimming time-series models in accordance with one or more embodiments. The set of operations include identifying one or more target times (Operation 202). As previously indicated, the target time may be a current time. For example, the current time may be determined based on a logical clock that tracks logical time (e.g., a counter value that is incremented responsive to changes or other events) or a physical clock that tracks physical time (e.g., the current date and time). Additionally or alternatively, a target time may be identified based on timestamps associated with time-series data of interest. For example, there may be a lag between the current time and incoming time-series data that is being evaluated. The target times may be identified from timestamps associated with the incoming data rather than based on the current time.

During the caching process, trimming logic 142 maps the one or more identified target times to a subset of data points in one or more time-series models (Operation 204). For seasonality models, the mapping may be performed based on a seasonal index. As an example, a time-series model may comprise seasonal factors for a weekly season, where each seasonal factor quantifies an amount of fluctuation observed due to an observed seasonal pattern. In the context of CPU usage, for example, a seasonal factor for Monday at 9 a.m. may quantify a seasonal high or seasonal low learned from training data for the corresponding hour. The seasonal factor may be multiplied or added to a trend line to account for seasonal patterns. In order to perform the mapping, a current time may be mapped to a corresponding seasonal factor. For instance, if the current time is 2:05 p.m. on a Friday, then the time may be mapped to the nearest neighbor in the time-series model (e.g., a seasonal factor for 2:00 p.m. on Friday in the hourly seasonality model).

In one or more embodiments, data points representing behavior within a threshold range of time from a target are mapped to the target time. In the context of a seasonality model, a threshold may be set such that parts of the time series model that are within an hour (or any other window) of the current time are cached. Thus, cache manager 140 may map the parts/data points of the model that represent seasonal factors sixty minutes before the current time and sixty minutes after the current time. In other words, cache manager 140 loads the seasonal factors corresponding to the (current−60 minutes) to (current+60 minutes) window into cache 144. This process allows the parts of the model to reside in the cache for an hour timeframe before a refresh. Further, the (current−60 minutes) data points allow time-series data older than the current time by up to more than an hour to be processed.

In one or more embodiments, the mapping may be based on a variance or confidence associated with data points in the time-series model. For example, the range may be increased as the variance in the observed behavior increases and decreased as the variance decreases. Thus, the number of data points that are mapped to a target time may be adjusted in real time based on behavior learned from a training set of time-series data.

In one or more embodiments, the threshold range is configurable by a user. For example, the user may adjust the range from a two-hour window to a one hour window (e.g., current−30 minutes to current+30 minutes), a three-hour window (e.g., current−90 minutes to current+90 minutes), or any other period of time. As another example, the user may shift the range to cache only parts of the time-series model to process older data (e.g., current−120 minutes) or to process current/upcoming data (e.g., current+120 minutes). Thus, the threshold range is flexible depending on the particular application.

In one or more embodiments, the mapping may vary for different time-series models. For example, trimming logic 142 may map a current time to seasonal factors within a particular window (e.g., two hours) for a daily seasonality model (i.e., a model that represents daily seasonal patterns). For a weekly seasonality model, trimming logic 142 may map the current time to seasonal factors to a different window (e.g., a twenty-four hour range). As another example, a monthly seasonality model may map a current time seasonality factors for a particular day of the month.

Referring again to FIG. 2, cache manager 140 generates a trimmed version of each of the one or more time-series models by loading the subset of data points into cache 144 (Operation 206). The other data points in the model are not stored in cache 144.

After the subset of data points have been loaded into the cache, cache manager 140 may determine whether to refresh the cache (Operation 208). In one or more embodiments, cache manager 140 periodically refreshes the cache. For example, if the cache has loaded seasonal factors within the (current−60 minutes) to (current+60 minutes) window, then cache manager 140 may refresh the cache every hour to keep the parts of the time-series model current with incoming time-series data streams. In other words, the window of cached seasonal factors is periodically shifted as a function of the current time.

If the model is refreshed, then the process returns to Operation 202 and selects a new target time based on newly received time-series data. For example, the new target time may be a refreshed current time. The process then repeats by mapping the new target time to the corresponding model parts and loading these parts into cache 144. The newly loaded portion of the model may overwrite the portion of the model that was previously cached.

4.0 Model Training and Evaluation

In one or more embodiments, time-series models are accessed for two distinct phases: a training phase and an evaluation phase. During the training phase, a time-series model is updated based on newly received time-series data. For example, seasonal factors, trends, and/or other patterns may be updated to account for the new observations. During the evaluation phase, patterns represented by a time-series model are compared to a set of target time-series data. Based on the comparison, a set of evaluation results are generated.

Figure 3:
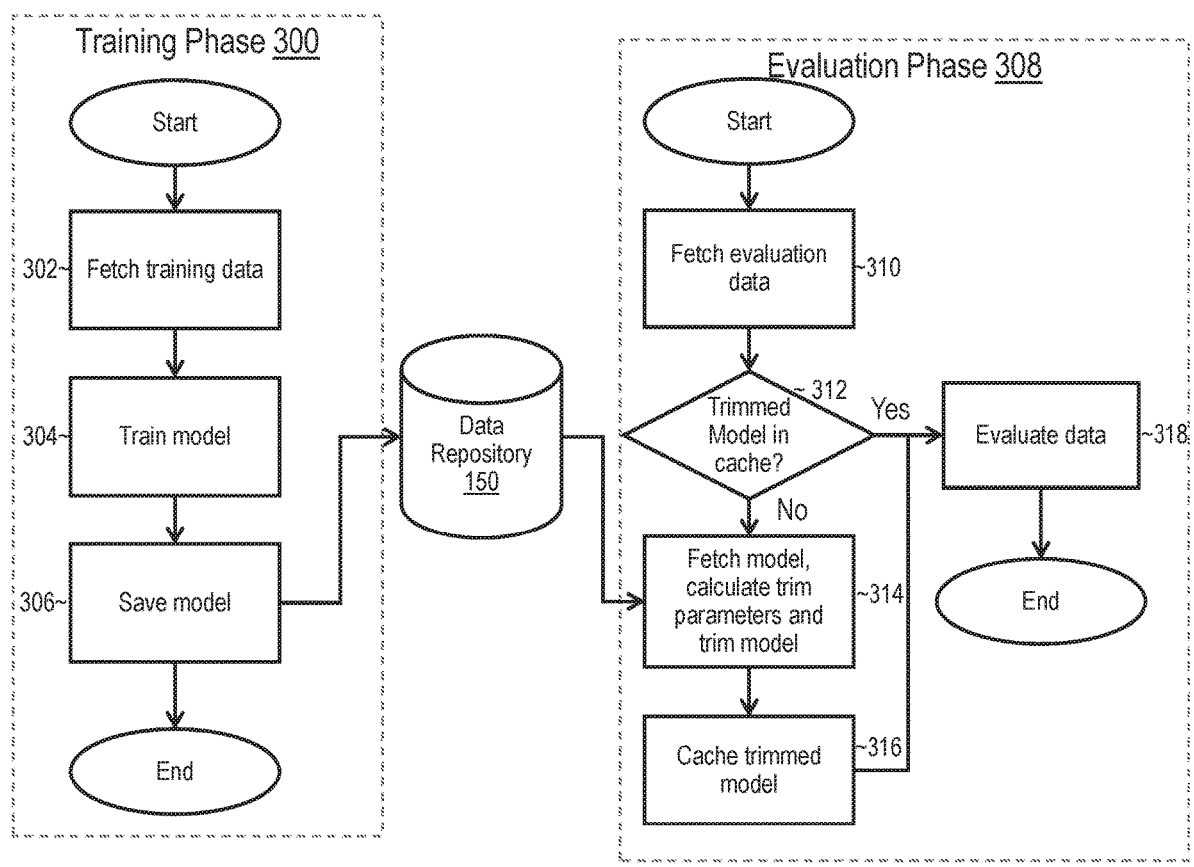
FIG. 3 illustrates an example cache process in accordance with one or more embodiments.

FIG. 3 illustrates an example set of operations for training and evaluating time-series models in accordance with one or more embodiments. The set of operations include distinct operations for training phase 300 and evaluation phase 308.

4.1 Training Phase

During training phase 300, training logic 132 fetches a set of training data (Operation 302). In one or more embodiments, the set of training data comprises newly collected data from targets 122a-i. For example, the training data may comprise data points identifying resource usage or performance sampled at periodic intervals.

Using the set of training data, training logic 132 trains one or more time-series models (Operation 304). For example, training logic 132 may train a set of seasonality models as a Holt-Winter model or time-series models described in U.S. application Ser. No. 15/266,971, entitled "SEASONAL AWARE METHOD FOR FORECASTING AND CAPACITY PLANNING"; U.S. application Ser. No. 15/445,763, entitled "METHOD FOR CREATING PERIOD PROFILE FOR TIME-SERIES DATA WITH RECURRENT PATTERNS"; U.S. application Ser. No. 15/057,065, entitled "SYSTEM FOR DETECTING AND CHARACTERIZING SEASONS"; U.S. application Ser. No. 15/057,060, entitled "SUPERVISED METHOD FOR CLASSIFYING SEASONAL PATTERNS"; U.S. application Ser. No. 15/057,062, entitled "UNSUPERVISED METHOD FOR CLASSIFYING SEASONAL PATTERNS"; and U.S. application Ser. No. 15/609,938, entitled "UNSUPERVISED METHOD FOR BASELINING AND ANOMALY DETECTION IN TIME-SERIES DATA FOR ENTERPRISE SYSTEMS", previously incorporated by reference.

In one or more embodiments, training logic 132 may train/retrain parts of a time-series model that are stored in cache 134. For example, two hours of seasonal factors may be stored within cache 134. As two hours of sampled data is collected from targets 122a-i, the seasonal factors stored within cache 134 may be updated. Thus, training of time-series models may occur without loading the entire time-series model into memory.

Once the time-series model has been trained, the model is stored in data repository 150 (Operation 306). If only a part of the time-series model is retrained, then the time-series model stored in data repository 150 is updated with the new set of data points.

4.2 Evaluation Phase

During evaluation phase 308, evaluation logic 134 fetches a set of time-series data to evaluate (Operation 310). For example, the evaluation data may comprise newly received data from targets 112a-i or time-series data provided by clients 160a-k.

Responsive to receiving the set of time-series data, evaluation logic 134 determines whether a trimmed version of the model is in the cache (Operation 312). If a trimmed version of the model is in the cache, then evaluation logic 134 may further determine whether it may be used to evaluate the target time-series data. A trimmed version of a time-series model may not be used to perform evaluations in some cases. For example, the seasonal factors within the (current−60 minutes) to (current+60 minutes) window may be cached. However, a user may be attempting to evaluate historical data older than an hour from the current time. If an evaluation request requires access to seasonal factors that are not cached, then a newly trimmed version of the model may be generated per the operations described below.

If a trimmed version of the model is not in the cache or the trimmed version that is cached cannot be used to perform the evaluation, then cache manger 140 fetches the appropriate time-series model(s) from data repository 150, determines the trim parameters based on the evaluation request, and trims the time-series model (Operation 314). The trim parameters may be determined relative to a target time such as previously described. For example, if a user is attempting to evaluate time-series data collected on Monday against a baseline model, then cache manager 140 may load the parts of a baseline model that represent a baseline for at least Monday. Cache manager 140 may further load parts of the baseline model representing a baseline for Tuesday in anticipation of further incoming data based on a mapping of the target time to a corresponding window as described above.

Once the trim parameters are determined from the mapping, cache manager 140 generates the trimmed version of the model by loading the corresponding data points into cache 144 and discarding the other data points in the model. (Operation 316).

Evaluation logic 134 accesses the trimmed model via cache 144 to generate an evaluation result (Operation 318). The evaluation result may vary from implementation to implementation. Example evaluation results may include, but are not limited to:

Notifications and alerts (e.g., a user may be notified if incoming time-series data falls outside a threshold range of a baseline model or projected time-series data points fall outside a threshold range of a forecasting model);

Reports and interactive displays (e.g., a forecast may be displayed using a forecasting model that projects future values based on incoming time-series data; users may interact with a displayed report to drill down to see forecasts for subgroups of targets and individual targets);

Updated model data (e.g., the seasonal factors and/or other data points in the trimmed version of the model may be updated based on newly received time-series data); and System configurations (e.g., additional resources may be deployed based on a forecast or baseline model, resources may be brought offline, hardware and/or software configurations may be changed)

Figure 4:
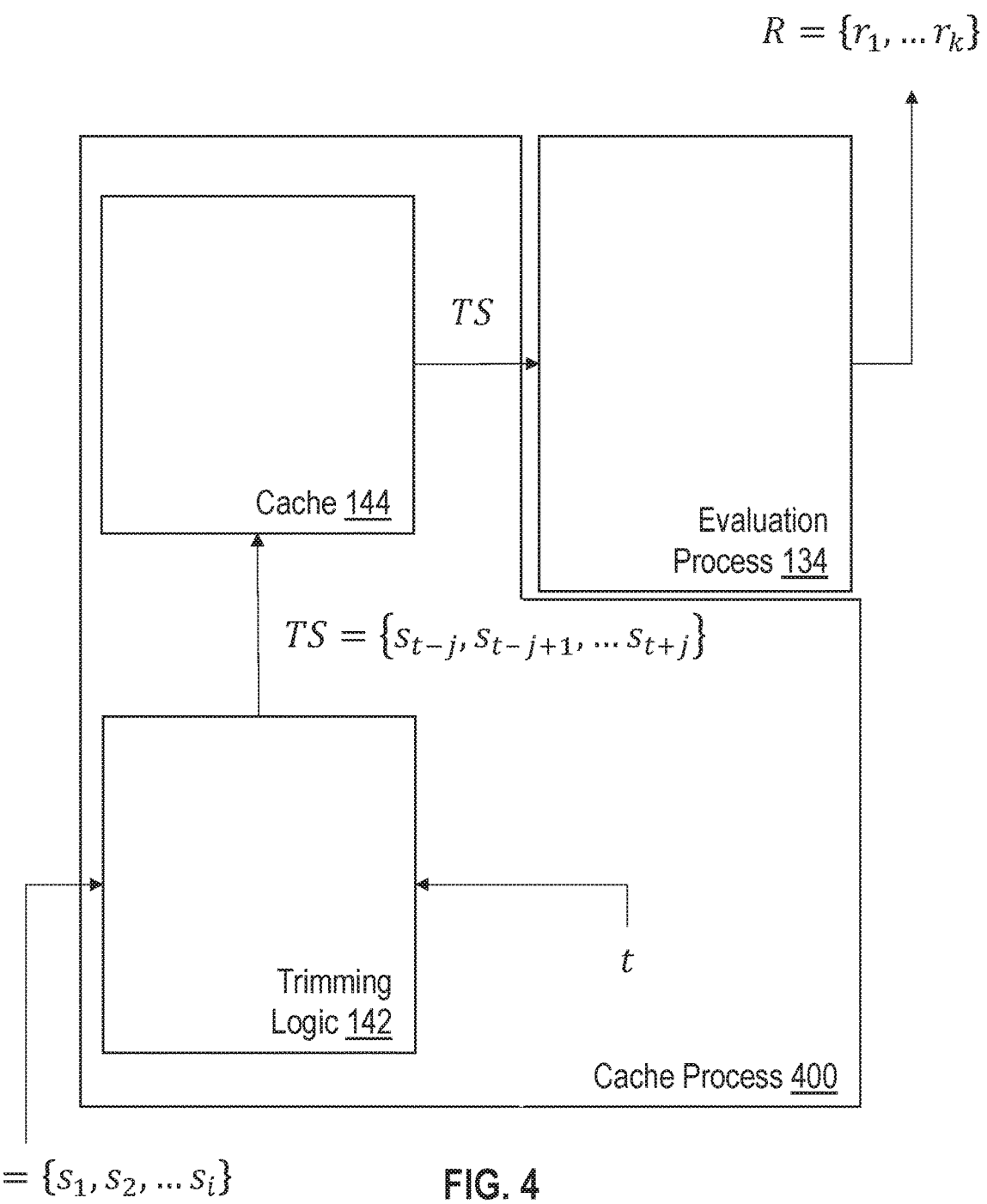
FIG. 4 illustrates an example set of operations for training and evaluating time-series models in accordance with one or more embodiments.

FIG. 4 illustrates an example cache and evaluation process in accordance with one or more embodiments. Cache process 400 receives seasonality model S comprising seasonal factors $\{s_1, s_2, \ldots s_i\}$. Cache process 400 uses trimming logic 142 to generate a trimmed version of the seasonality model TS comprising a subset of S including $\{s_{t-j}, s_{t-j+1}, \ldots s_{t+j}\}$, where t is the target time and j represents a threshold range. For example, if seasonality model S represents seasonal factors at different minutes of a season, then TS may comprise data points within a one hour window as follows $\{s_{t-30}, s_{t-29}, \ldots s_{t+30}\}$. Cache process loads TS into cache 144. During the evaluation phase, evaluation process 402 accesses TS from cache 144 and outputs evaluation results R comprising data points $\{r_1, r_2, \ldots r_k\}$. As previously indicated, the evaluation results may comprise forecast values, updated model data, report data, system configuration values, etc.

5.0 Microservice-Based Caching

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The predictive alerting described above may be encapsulated into a microservice, according to one or more embodiments. In other words, a microservice that performs time-series caching may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in seasonality application detects that a threshold is crossed. For example, a user may request a trigger into the microservices manager when the seasonality application detects above 90% CPU usage within the next hour.

In one embodiment, the trigger, when satisfied, might output time-series data for consumption by the target microservice. In another embodiment, the trigger, when satisfied, outputs a binary value indicating the trigger has been satisfied, or outputs the name of the field (for example, "West Server CPU Usage") or other context information for which the trigger condition was satisfied. Additionally or alternatively, the target microservice may be connected to one or more other microservices such that the alert is input to the other microservices. Other microservices may perform responsive actions based on the predictive alert, including, but not limited to, deploying additional resources, adjusting system configurations, and/or generating GUIs.

Actions

In the same or a different embodiment, a plugged-in seasonality application may expose actions to the microservices manager. The exposed actions may receive, as input, data or an identification of a data object or location of data, that causes data to be moved into a data cloud. The data cloud may be a seasonality cloud, which automatically analyzes data for the detection and characterization of seasons. In another embodiment, the exposed actions may receive, as input, a request to increase or decrease existing alert thresholds. The input might identify existing in-application caching thresholds and whether to increase or decrease the amount of data cached. In another embodiment, the input might request the seasonality application to create new in-application alerts. The in-application alerts may trigger alerts to the user while logged into the application, or may trigger alerts to the user using default or user-selected alert mechanisms available within the seasonality application itself, rather than through other applications plugged into the microservices manager. In yet another embodiment, the seasonality application may generate and provide a forecast based on input that identifies, locates, or provides historical data to forecast, and defines the extent or scope of the requested forecast (e.g., 3 hours out for the West Server CPU Usage dataset stored in the data cloud). The action, when triggered, causes the seasonality application to provide, store, or display the forecast, for example, as a data model or as aggregate data that describes a data model.

6.0 Cloud Service Overview

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7.0 Hardware Overview

According to one or more embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
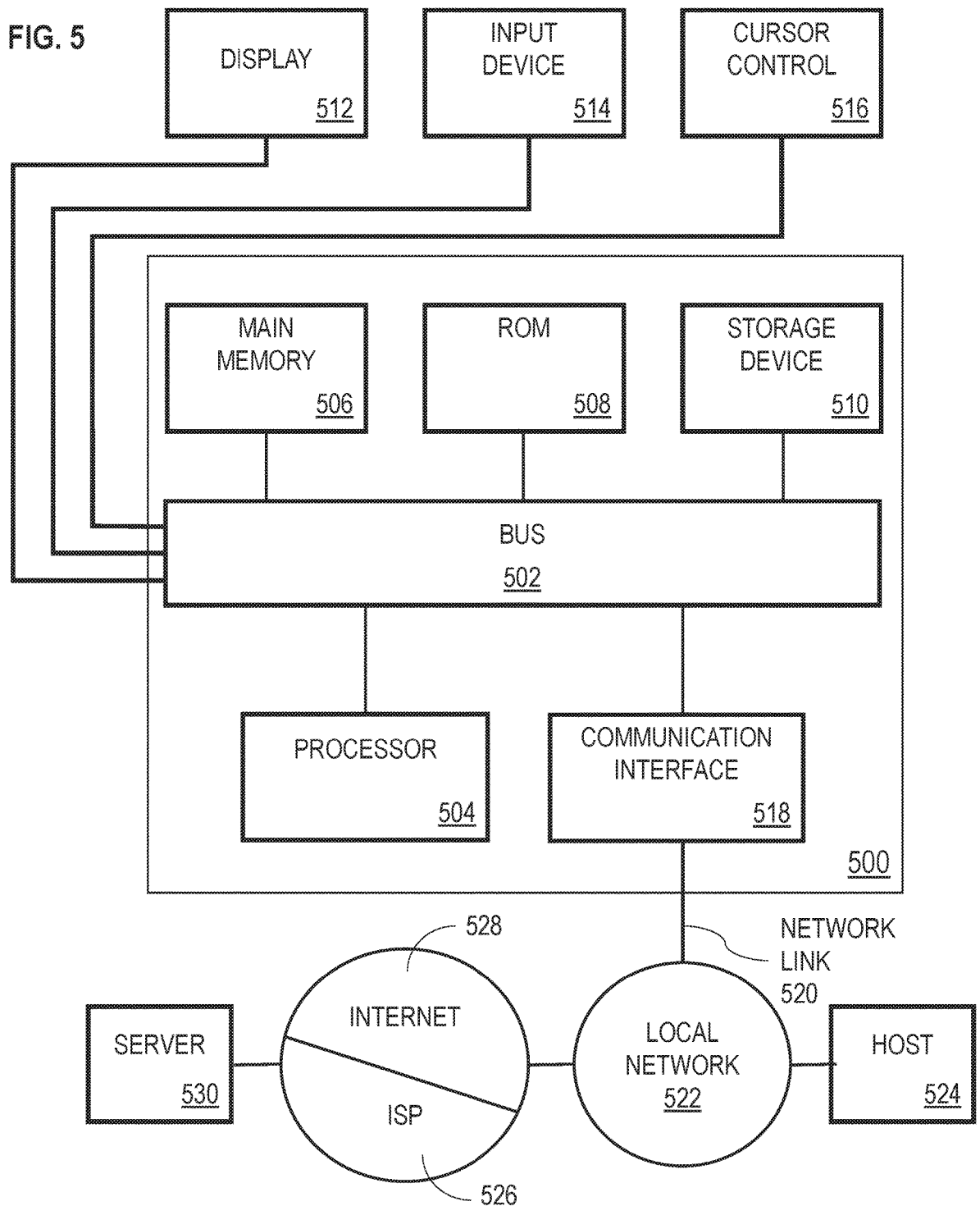
FIG. 5 illustrates an example computing system upon which one or more embodiments may be implemented.

For example, FIG. 5 is a block diagram that illustrates computer system 500 upon which one or more embodiments may be implemented. Computer system 500 includes bus 502 or other communication mechanism for communicating information, and hardware processor 504 coupled with bus 502 for processing information. Hardware processor 504 may be, for example, a general purpose microprocessor.

Computer system 500 also includes main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes read only memory (ROM) 508 or other static storage device coupled to bus 502 for storing static information and instructions for processor 504. Storage device 510, such as a magnetic disk or optical disk, is provided and coupled to bus 502 for storing information and instructions.

Computer system 500 may be coupled via bus 502 to display 512, such as a cathode ray tube (CRT), liquid crystal display (LCD), or light-emitting diode (LED), for displaying information to a computer user. Input device 514, which may include physical and/or touchscreen based alphanumeric keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to host computer 524 or to data equipment operated by Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, server 530 might transmit a requested code for an application program through Internet 528, ISP 526, local network 522 and communication interface 518.

The received code may be executed by processor 504 as it is received, and/or stored in storage device 510, or other non-volatile storage for later execution.

8.0 Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
storing, by one or more hardware processors, a time-series model, the time-series model including a plurality of data points representing seasonal behavior in a training set of time-series data for at least one season, wherein the plurality of data points do not include an explicit timestamp;
determining, by the one or more hardware processors, a target time for evaluating the time-series model;
mapping, by the one or more hardware processors to a subset of the plurality of data points, the target time or one or more times relative to the target time;
based on the mapping, generating, by the one or more hardware processors, a trimmed version of the time-series model in a cache by loading the subset of the plurality of data points into the cache, the subset of data points representing seasonal behavior in the training set of time-series data for a portion of the at least one season within a threshold range of the target time;
determining, by the one or more hardware processors, whether a target set of time-series data includes data points outside the threshold range of the target time;
responsive to determining that the target set of time-series data includes data points outside the threshold range of the target time, updating, by the one or more hardware processors, the trimmed version of the time-series model in the cache by loading a second subset of the plurality of data points into the cache; and
evaluating, by the one or more hardware processors, the target set of time-series data using the updated trimmed version of the time-series model in the cache to output an evaluation result.

2. The method of claim 1, wherein the target time is determined based on at least one of a current time or a time associated with the target set of time-series data.

3. The method of claim 1, further comprising determining a new target time for evaluating the time-series model; and responsive to determining the new target time, updating the trimmed version of the time-series model in the cache by loading a third subset of the plurality of data points into the cache, the third subset of data points representing seasonal behavior in the training set of time-series data for a second portion of the at least one season.

4. The method of claim 1, wherein the mapping is based on a variance in the data points representing seasonal behavior in the training set of time-series data.

5. The method of claim 1, wherein the trimmed version of the time-series model does not include data points that do not represent seasonal behavior.

6. The method of claim 1, further comprising retraining the trimmed version of the time-series model using the target set of time-series data.

7. The method of claim 1, further comprising: detecting a change in the time-series model, the change causing the time-series model to include data points representing seasonal behavior for a different season; responsive to detecting the change in the time-series model, updating the trimmed version of the time-series model to include a greater number or lesser number of data points.

8. The method of claim 7 wherein the change in the time-series model is from a daily season to a weekly season.

9. One or more non-transitory computer-readable media storing instructions which, when executed by one or more hardware processors, cause performance of operations comprising:
storing a time-series model, the time-series model including a plurality of data points representing seasonal behavior in a training set of time-series data for at least one season, wherein the plurality of data points do not include an explicit timestamp;
determining a target time for evaluating the time-series model;
mapping, to a subset of the plurality of data points, the target time or one or more times relative to the target time;

based on the mapping, generating a trimmed version of the time-series model in a cache by loading the subset of the plurality of data points into the cache, the subset of data points representing seasonal behavior in the training set of time-series data for a portion of the at least one season within a threshold range of the target time;

determining whether a target set of time-series data includes data points outside the threshold range of the target time;

responsive to determining that the target set of time-series data includes data points outside the threshold range of the target time, updating the trimmed version of the time-series model in the cache by loading a second subset of the plurality of data points into the cache; and evaluating the target set of time-series data using the updated trimmed version of the time-series model in the cache to output an evaluation result.

10. The one or more non-transitory computer-readable media of claim 9, wherein the target time is determined based on at least one of a current time or a time associated with the target set of time-series data.

11. The one or more non-transitory computer-readable media of claim 9, wherein the instructions further cause operations comprising determining a new target time for evaluating the time-series model; and responsive to determining the new target time, updating the trimmed version of the time-series model in the cache by loading a third subset of the plurality of data points into the cache, the third subset of data points representing seasonal behavior in the training set of time-series data for a second portion of the at least one season.

12. The one or more non-transitory computer-readable media of claim 9, wherein the mapping is based on a variance in the data points representing seasonal behavior in the training set of time-series data.

13. The one or more non-transitory computer-readable media of claim 9, wherein the trimmed version of the time-series model does not include data points that do not represent seasonal behavior.

14. The one or more non-transitory computer-readable media of claim 9, the instructions further causing operations comprising retraining the trimmed version of the time-series model using the target set of time-series data.

15. The one or more non-transitory computer-readable media of claim 9, the instructions further causing operations comprising: detecting a change in the time-series model, the change causing the time-series model to include data points representing seasonal behavior for a different season; responsive to detecting the change in the time-series model, updating the trimmed version of the time-series model to include a greater number or lesser number of data points.

16. The one or more non-transitory computer-readable media of claim 15 wherein the change in the time-series model is from a daily season to a weekly season.

17. A system comprising:
one or more hardware processors;
one or more non-transitory computer-readable media storing instructions which, when executed by the one or more hardware processors, cause:
storing a time-series model, the time-series model including a plurality of data points representing seasonal behavior in a training set of time-series data for at least one season, wherein the plurality of data points do not include an explicit timestamp;
determining a target time for evaluating the time-series model;
mapping, to a subset of the plurality of data points, the target time or one or more times relative to the target time;
based on the mapping, generating a trimmed version of the time-series model in a cache by loading the subset of the plurality of data points into the cache, the subset of data points representing seasonal behavior in the training set of time-series data for a portion of the at least one season within a threshold range of the target time;
determining whether a target set of time-series data includes data points outside the threshold range of the target time;
responsive to determining that the target set of time-series data includes data points outside the threshold range of the target time, updating the trimmed version of the time-series model in the cache by loading a second subset of the plurality of data points into the cache; and
evaluating the target set of time-series data using the updated trimmed version of the time-series model in the cache to output an evaluation result.

18. The system of claim 17, wherein the target time is determined based on at least one of a current time or a time associated with the target set of time-series data.

19. The system of claim 17, wherein the instructions further cause: determining a new target time for evaluating the time-series model; and responsive to determining the new target time, updating the trimmed version of the time-series model in the cache by loading a third subset of the plurality of data points into the cache, the third subset of data points representing seasonal behavior in the training set of time-series data for a second portion of the at least one season.

20. The system of claim 17, wherein the instructions further cause: detecting a change in the time-series model, the change causing the time-series model to include data points representing seasonal behavior for a different season; responsive to detecting the change in the time-series model, updating the trimmed version of the time-series model to include a greater number or lesser number of data points.

* * * * *